April 9, 1940.    C. M. HEPWORTH ET AL    2,196,918
OPTICAL PROJECTING APPARATUS
Filed Oct. 3, 1938    2 Sheets-Sheet 1

INVENTORS
C. M. HEPWORTH
P. KIMBERLEY
BY Young, Emery & Thompson
ATTYS.

April 9, 1940.   C. M. HEPWORTH ET AL   2,196,918
OPTICAL PROJECTING APPARATUS
Filed Oct. 3, 1938   2 Sheets-Sheet 2
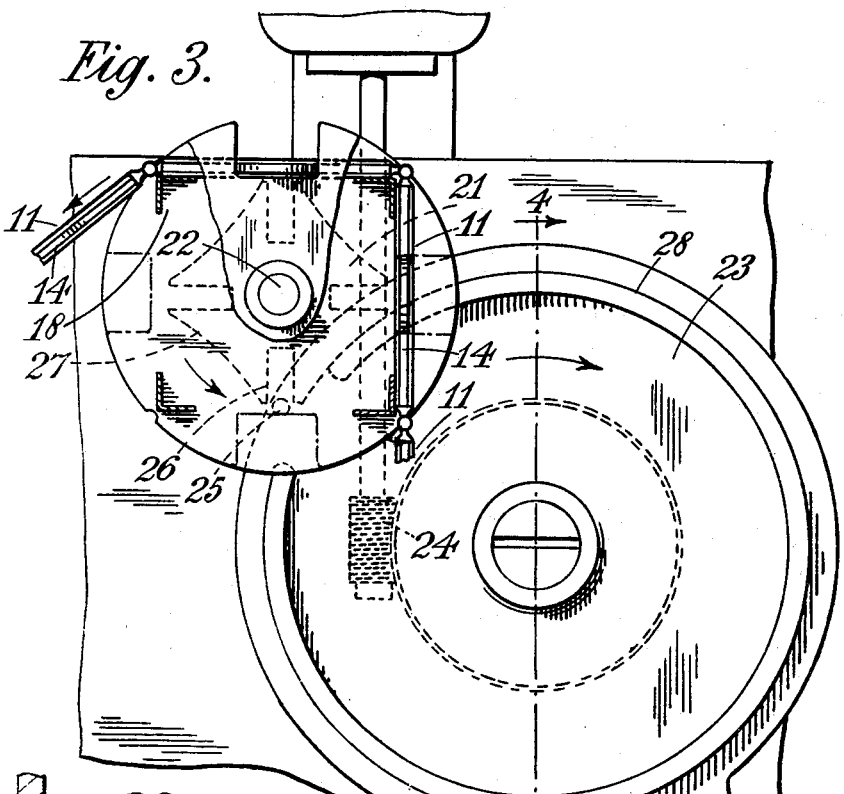
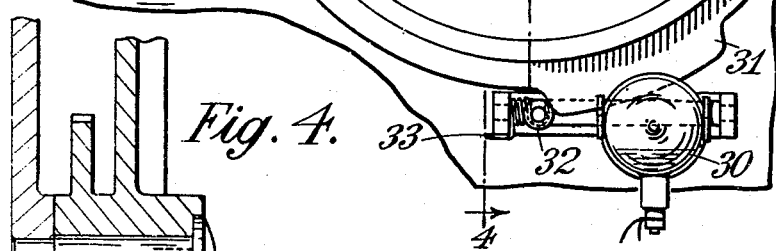
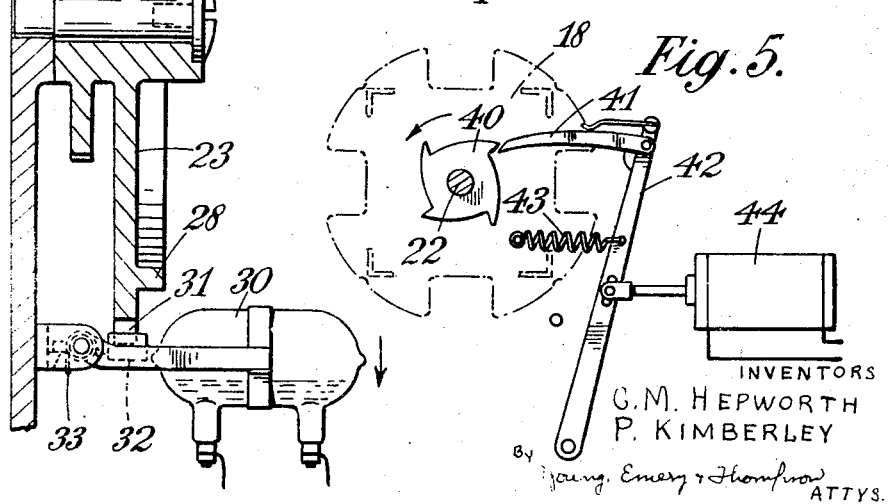
INVENTORS
C. M. HEPWORTH
P. KIMBERLEY
BY Young, Emery & Thompson
ATTYS.

Patented Apr. 9, 1940

2,196,918

UNITED STATES PATENT OFFICE 2,196,918

OPTICAL PROJECTING APPARATUS

Cecil Milton Hepworth and Paul Kimberley, London, England

Application October 3, 1938, Serial No. 233,072
In Great Britain October 7, 1937

3 Claims. (Cl. 88—28)

This invention relates to optical projecting apparatus, intended particularly but not exclusively for advertising purposes, and an object of the invention is to provide improved means whereby a plurality of slides each in the form of a transparency (e. g., photographically produced) may be moved in a predetermined succession one at a time into the correct position for projection.

The invention accordingly provides, in or for use in an optical projecting apparatus, a slide-changing mechanism comprising an endless carrier formed of a plurality of rectangular leaves hinged together at opposed marginal edges and each constituting an open frame in which a slide may be removably inserted, and means for traversing the carrier step by step to bring each frame in succession up to the projector gate.

According to a feature of the invention the carrier frames may be interconnected by detachable hinge pins, each of which is formed with portions of reduced diameter co-operating with the hinge eyes of one frame of each pair of adjacent frames to form a normally interlocking engagement for the pin.

According to a further feature of the invention the traversing means for the endless carrier may comprise a cube-form pulley the faces of which correspond in length with that of the carrier frames and over which the carrier is lapped, and a device for driving (e. g., through a Geneva-stop mechanism) the pulley intermittently through 90° at each step.

Figure 1:
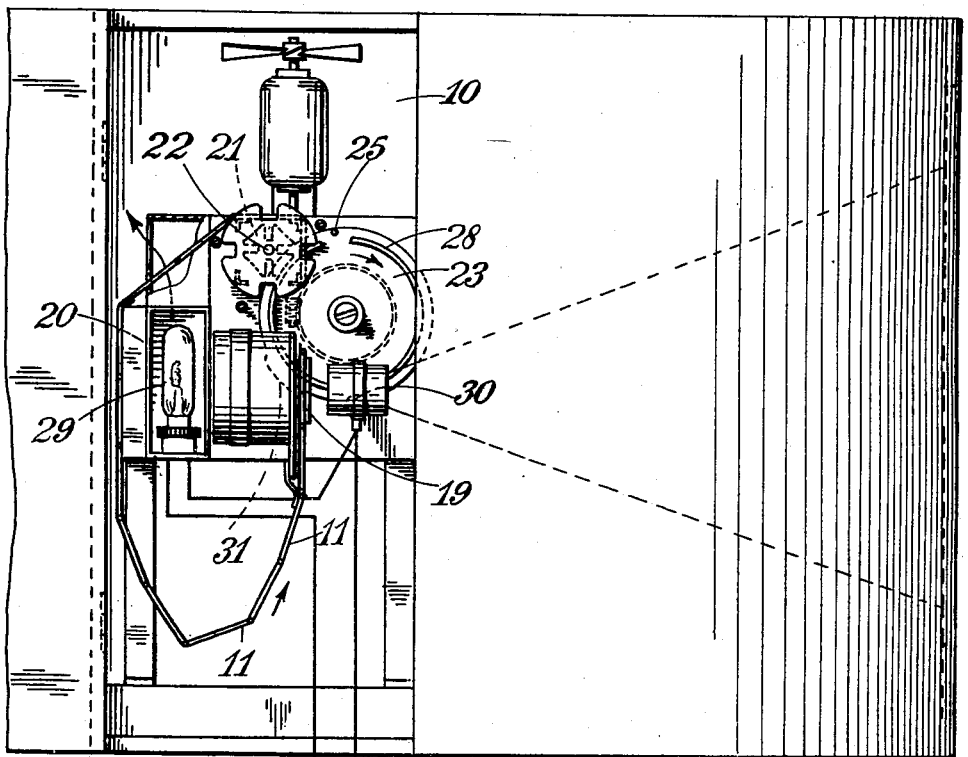
Figure 2:
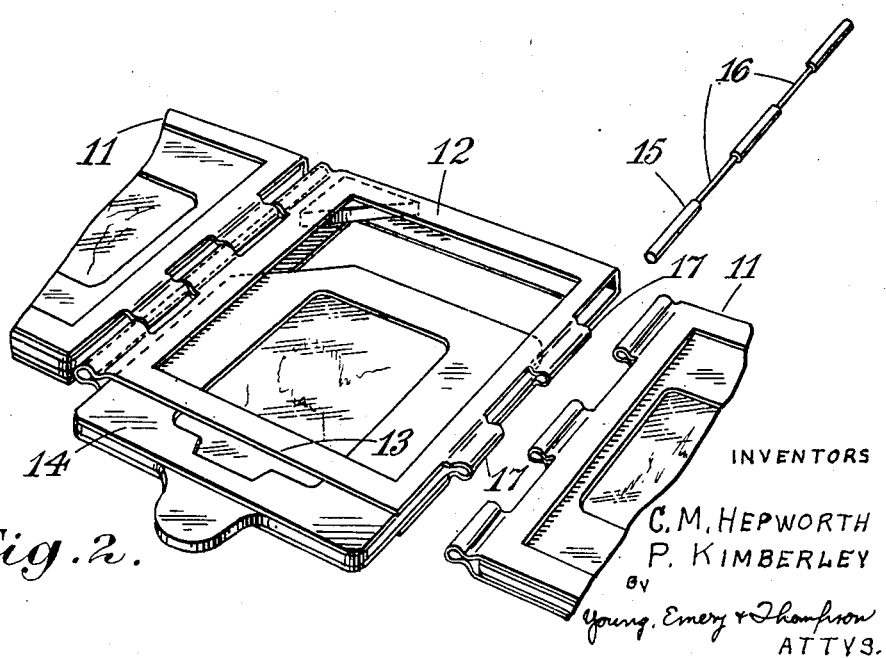

An example according to the invention will now be described with reference to the accompanying drawings which are to some extent diagrammatic and in which:

Figure 1 is a side elevation showing the general arrangement of the projector,

Figure 2 is a perspective view of a portion of the endless carrier showing one of the slides partially inserted in its corresponding frame, Figure 3 is a side elevation, corresponding to Figure 1 but on a larger scale, showing the driving means for the endless carrier, Figure 4 is a section at the line 4—4 of Figure 3 showing details of the driving mechanism, and Figure 5 is a side elevation illustrating a modified driving gear.

Like reference numerals indicate like parts throughout the figures.

In this example the projector 10—apart from the slide carrier and its driving mechanism and associated parts—is of standard design. The endless carrier comprises a plurality of rectangular leaves 11 hinged together at opposed marginal edges and each constituting a marginal frame closed at one side 12 and open at the other side 13 for the insertion and withdrawal of the slides 14. The frames 11 are interconnected by detachable hinge pins 15 each of which is formed with short lengths 16 of reduced diameter adapted to register with the hinge eyes 17 of one frame of each pair of adjacent frames. The eye or socket portions of all the frame hinges are of the same diameter. When the eye portions of two adjacent frames are in register the hinge pin may readily be inserted, and when in position it will be appreciated that there will be a certain degree of play between the pin, at the portions 16 of reduced diameter, and the corresponding hinge portions 17 of the linked frame. Thus the normal pull exerted on the frames of the carrier will result in a separation of the adjacent frames at the hinges, and accidental endwise displacement of the hinge pins will be prevented by virtue of the interlocking engagement between the hinge portions 17 and the shoulders formed on the pin at opposite ends of the reduced portions 16.

The endless carrier is mounted on a cube-shaped pulley 18 the faces of which correspond in length to the individual frames of the carrier. The pulley 18 is mounted above the projector gate 19 and is driven intermittently through 90° at each step, the arrangement being such that at each dwell in the rotational movement of the pulley, the upper and lower faces will be horizontally disposed, and consequently the side faces will be vertically disposed. Thus at each dwell in the movement of the pulley one of the carrier frames will lie horizontally across the top face of the pulley, and the "following" portion of the carrier will lie vertically against one of the side faces of the pulley and will extend vertically through the projector gate, as shown in Figure 1. The pulley 18 is driven in a counter-clockwise direction, so that the endless carrier travels upwards through the projector gate. The advancing portion of the carrier is guided round the back of the lamp house 20.

In the arrangement shown in Figures 3 and 4 the pulley 18 is driven by an electric motor through a Geneva-stop mechanism comprising a star wheel 21 of usual design mounted on the pulley shaft 22 and co-operating with a pin wheel 23 which in turn is motor driven through gearing 24. The pin 25 engages slots 26 in the star wheel in the usual way, and the arcuate portions 27 of the star wheel co-operate with the annular rim 28 on the pin wheel to lock the star wheel after each actuation and during continued movement of the pin wheel. The star wheel 21 and consequently the pulley 18 is rotated through an angle of 90° on each complete revolution of the pin wheel 23. During each intermittent movement of the pulley 18 the projector lamp 29 is switched off by means of a mercury switch 30 controlled by a cam 31 on the pin wheel 23. The cam 31 is arranged to operate a switch lever 32 controlled by a spring 33. When the cam 31 engages the lever 32 the switch 30 is rocked into a position in which the lamp circuit is broken. When the cam 31 has passed out of engagement with the lever 32 the spring 33 restores the switch to the contact position. The cam 31 is maintained in operation during the whole of that portion of each revolution of the pin wheel 23 which is responsible for movement of the star wheel. In consequence the illumination of the projector is cut off during each change from one slide to another, and the movement of the slide carrier is obscured.

In the alternative driving mechanism shown in Figure 5 the pulley shaft 22 carries a ratchet 40 which is operated by a pawl 41 carried at one end of a lever 42 controlled by a short tension spring 43 and a solenoid 44. The driving stroke of the lever 42 is effected by the spring 43 and the return movement of the lever is effected by the solenoid 44 which in turn is motor controlled.

Each of the carrier frames 11 may be fabricated from a single piece of sheet metal with bent-over tabs curved in one direction to form the hinge eyes, and in the other direction to embrace the slide.

We claim:

1. A chain-like slide-carrier for an optical projection apparatus, comprising a projector, a plurality of slides and means to move the slides in predetermined succession into position for use with the projector, said slide-carrier comprising in combination a plurality of leaves each constituting an open frame for reception of a slide and hinges interconnecting the leaves along opposed parallel edges to form an endless chain-like arrangement whereof each hinge comprises hinge eyes extending towards a common axis from the edges of each frame of a pair of adjacent frames, and a hinge pin which passes through said hinge eyes and is formed with portions of reduced diameter co-operating with the hinge eyes of one frame of each pair of adjacent frames to form a normally interlocking engagement for the pin.

2. A chain-like slide-carrier according to claim 1, in which those parts of the hinge pin of reduced diameter are of such length and are so positioned in the pin as to engage within the hinge eyes of one frame and other portions of the pin of larger diameter are so positioned as to fit slidingly within the hinge eyes of the adjacent frame whereby a small separation of the two frames from the common axis specified is permitted lengthwise of the chain of frames and those hinge eyes engaging portions of the pin of reduced diameter engage at least on one side with a shoulder formed on the pin between the portions of different diameters thus preventing displacement of the frame axially along the pin, and thereby interlocking the pin and the frame together.

3. Optical projection apparatus comprising in combination an endless carrier as claimed in claim 1, a projector gate, a projection lens system and a projection light in operative relation with the gate, a polygonal roller over which the carrier passes and by which it is traversed through the optical system, a mercury switch controlling an energizing circuit for the projection light, a tiltable support for the mercury switch and a cam rotatable with the roller and operatively engaged with the tiltable support whereby when the roller is moved to change the position of the endless carrier the cam tilts under such support so that the mercury switch breaks the circuit and the latter is re-energized when the carrier comes to rest and the cam is moved to a position to allow the switch support to resume its initial position.

CECIL MILTON HEPWORTH.
PAUL KIMBERLEY.